United States Patent [19]

Friggstad

[11] 4,355,689
[45] Oct. 26, 1982

[54] FLEXIBLE WING IMPLEMENT WITH UNIVERSAL HINGES AND SELECTIVE LOCKING STRUCTURE ASSOCIATED WITH WINGS THEREOF

[75] Inventor: Terrance Friggstad, Frontier, Canada

[73] Assignee: Friggstad Manufacturing Ltd., Saskatchewan, Canada

[21] Appl. No.: 146,408

[22] Filed: May 5, 1980

Related U.S. Application Data

[63] Continuation-in-part of Ser. No. 902,120, May 2, 1978, abandoned, which is a continuation-in-part of Ser. No. 807,556, Jun. 17, 1977, abandoned.

[51] Int. Cl.³ .............................................. A01B 73/00
[52] U.S. Cl. ................................................... 172/311
[58] Field of Search .............. 172/310, 311, 456, 630, 172/632, 633, 662

[56] References Cited

U.S. PATENT DOCUMENTS

| | | | |
|---|---|---|---|
| 3,321,028 | 5/1967 | Groenke | 172/311 |
| 3,505,704 | 4/1970 | Hornung et al. | 172/311 X |
| 4,102,404 | 7/1978 | Krammer | 172/310 |
| 4,105,077 | 8/1978 | Seifert, Jr. | 172/311 |
| 4,109,928 | 8/1978 | Watkins | 172/311 X |
| 4,133,391 | 1/1979 | Richardson et al. | 172/311 |

*Primary Examiner*—Richard T. Stouffer
*Attorney, Agent, or Firm*—Stanley G. Ade

[57] ABSTRACT

A deep tillage cultivator consists of a center section and at least two wing sections one upon each side hingedly secured to said center section. The sections are wheel supported along a transverse center line and by a hitch assembly extending from the center section. Also, castor wheel assemblies extend forwardly from the outer wing sections on each side of said center section. Flexible fore and aft connections are provided between adjacent sections with a universal joint type of connection being provided between the sections to permit better flexibility to wide cultivators. Structure is provided to stabilize the universal type hinge connection prior to folding the sections for transport purposes.

32 Claims, 16 Drawing Figures

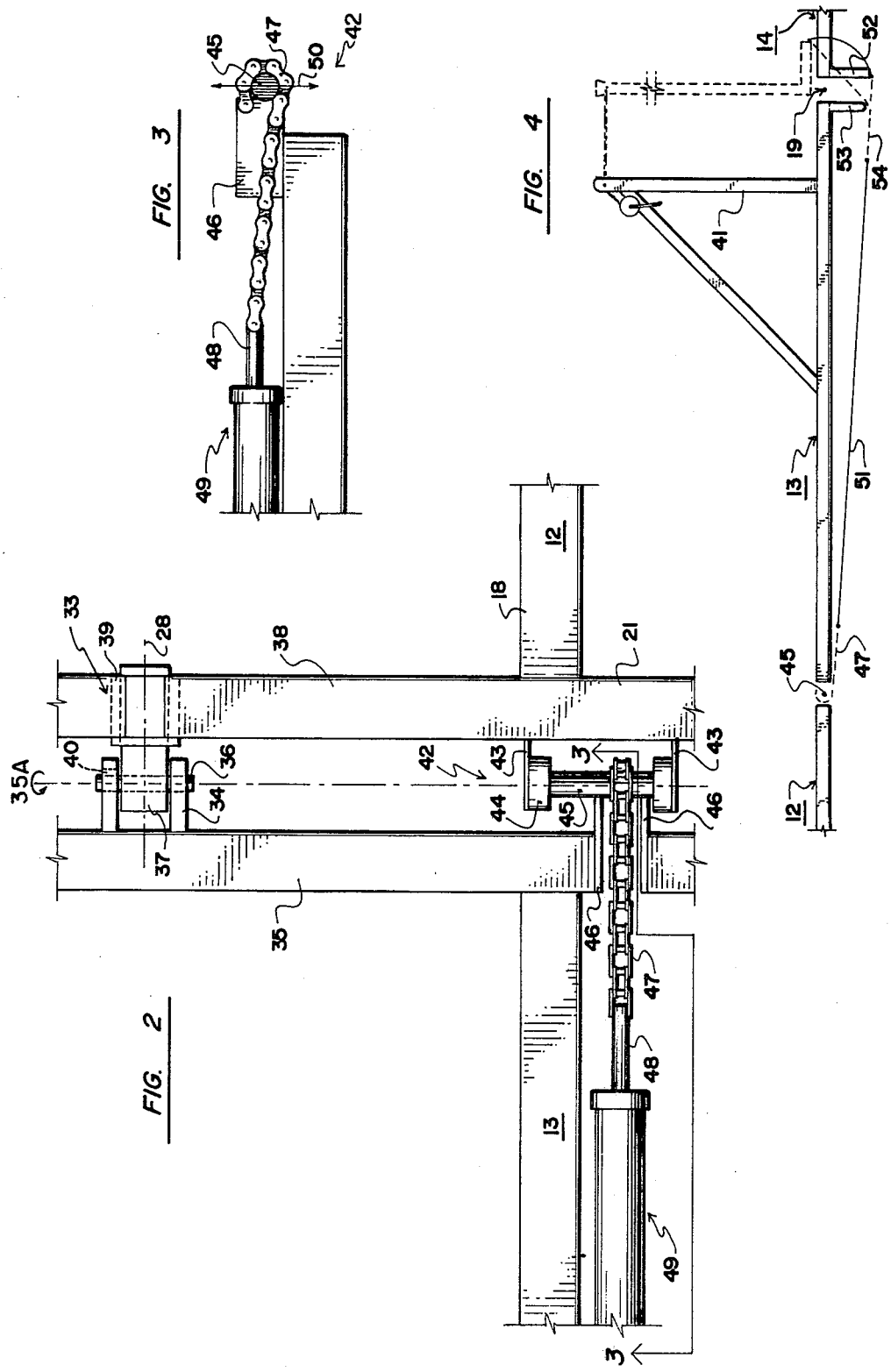

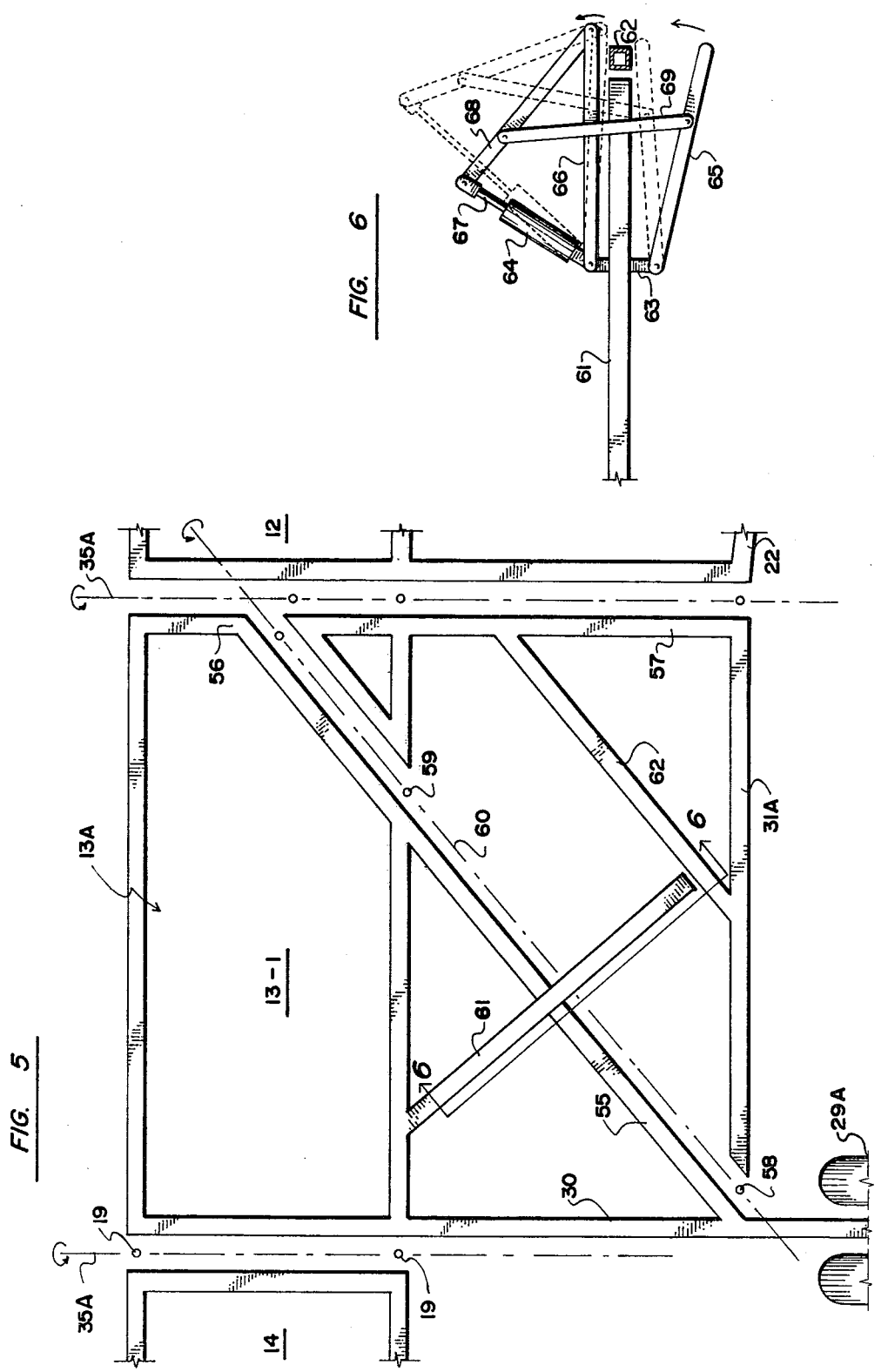

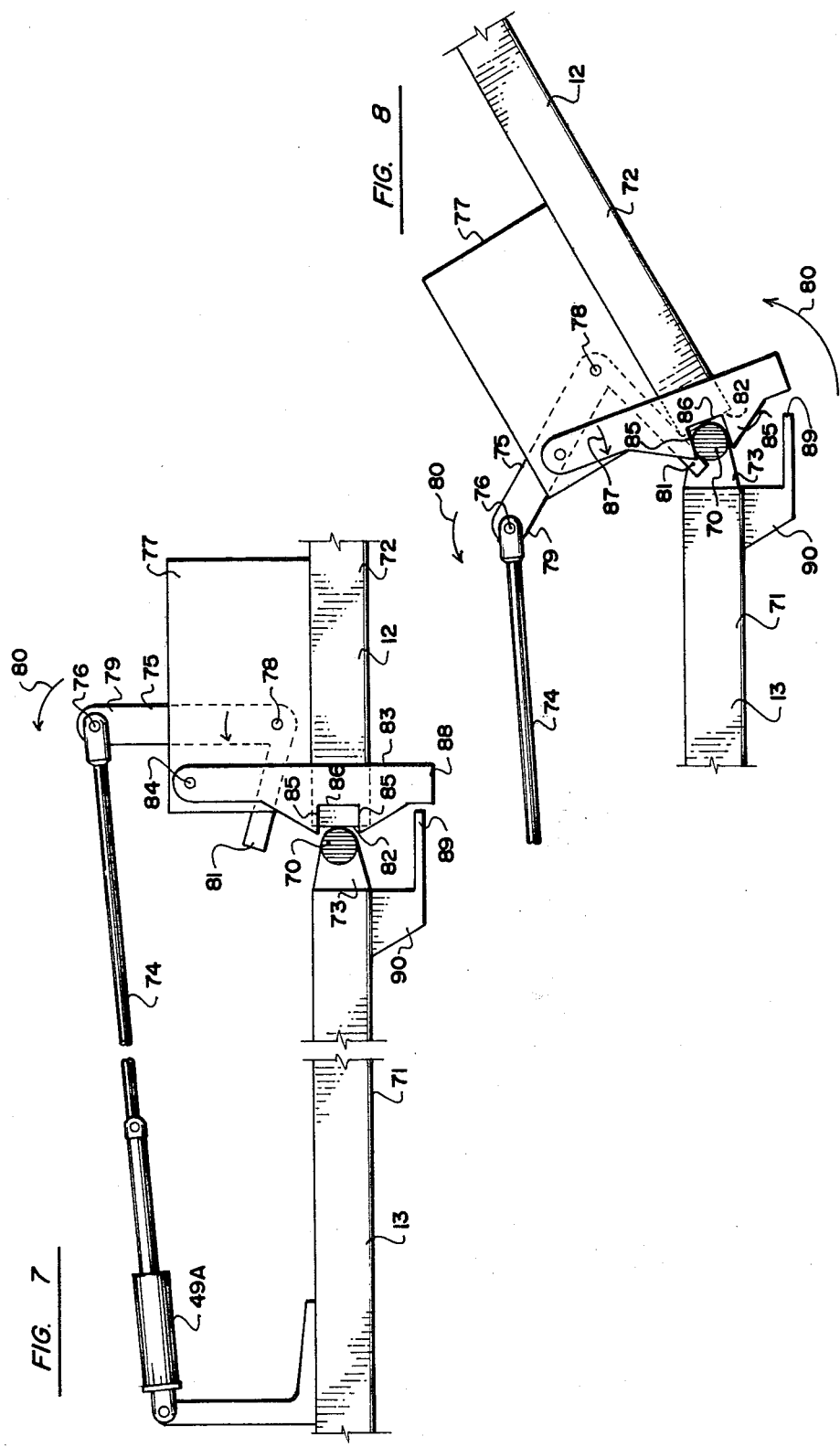

4,355,689

FLEXIBLE WING IMPLEMENT WITH UNIVERSAL HINGES AND SELECTIVE LOCKING STRUCTURE ASSOCIATED WITH WINGS THEREOF

BACKGROUND OF THE INVENTION

This invention relates to new and useful improvements in ground working implements, particularly implements such as cultivators and is a Continuation-In-Part application of Ser. No: 902,120 filed May 2nd, 1978 (now abandoned) which in turn is a Continuation-In-Part application of United States application Ser. No: 807,556, filed June 17th, 1977 (now abandoned).

Present day ground cultivation utilizes relatively wide implements to reduce the time taken in cultivating a field and to take advantage of the relatively high powered tractors now available.

While it is conventional to provide several cultivator sections hinged together, nevertheless with deep tillage cultivators or chisel plows in particular, it is becoming increasingly difficult to incorporate the necessary flexibility of movement between adjacent sections in order to eliminate uneven depth penetration.

For example, with conventional hinging methods, the hinge line is normally along a fore and aft line substantially parallel to the longitudinal axis of the implement and the outer sections therefore can only flex around the fore and aft hinge lines. The cultivators are normally vertically supported in the front by the hitch and in relatively wide machines, the outermost sections depend upon this point of support around the transverse axis, but unfortunately these outer sections are too far from the point of support provided by the hitch. The torque action of the tillage tools in the soil, results in the flexing of the frame and twisting in the outside sections resulting in uneven depth of tillage. This is particularly noticeable when used on uneven ground as is often the case.

SUMMARY OF THE INVENTION

The present invention overcomes these disadvantages by providing, in a ground working implement such as a cultivator and the like, a center section, a hitch assembly extending forwardly from said center section, at least two wing sections upon each side of said center section including an inner wing section and an outer wing section, said inner wing section being pivotally secured to said center section along a line parallel to the longitudinal axis of said center section and ground engaging wheels supporting said center section and said wing sections; the improvement comprising in combination hinge means between said inner wing section and said center section, said hinge means including means whereby said inner wing sections are selectively hinged along the line parallel to the longitudinal axis of said center section moving towards a transport folding position and hinged universally when in a field working position.

Another aspect of the invention is to provide a device of the character herewithin described which includes additional support points extending forwardly of the outer sections and having ground engaging wheels thereon, to facilitate control of the outer sections so that they do not depend entirely on the hitch for support.

Another aspect of the invention is to provide a device of the character herewithin described in which one or more of the outer sections are flexible along a diagonal hinge line so that the outer section can rotate or pivot not only about the fore and aft axis, but also along the diagonal axis which, in conjunction with the additional wheel support, enables the device to roll over uneven terrain yet maintain a substantially even depth penetration of the implements carried by this assembly.

Still another object of the invention is to provide a device of the character herewithin described in which it is desirable to have all of the fore and aft hinge lines of the sections, substantially parallel when folding into transport position.

A yet further object of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

BRIEF DESCRIPTION OF THE DRAWINGS

FIG. 2 is a fragmentary top plan view of the preferred embodiment of the hinge connection between the inner and outer wing sections.

FIG. 3 is a fragmentary end elevation substantially along the line 3—3 of FIG. 2.

FIG. 4 is a schematic rear view showing an alternative method of locking the front hinge component of FIG. 2.

FIG. 5 is a fragmentary schematic plan view showing an alternative construction for the universal hinging action of the outer section to the inner section.

FIG. 6 is a fragmentary view substantially along the line 6—6 of FIG. 5.

FIG. 7 is a schematic end view showing the preferred method of locking the front hinge component of FIG. 2 shown in the released position.

FIG. 8 is a view similar to FIG. 7 but in the locked position.

In the drawings like characters of reference indicate corresponding parts in the different figures.

DETAILED DESCRIPTION

Figure 1:
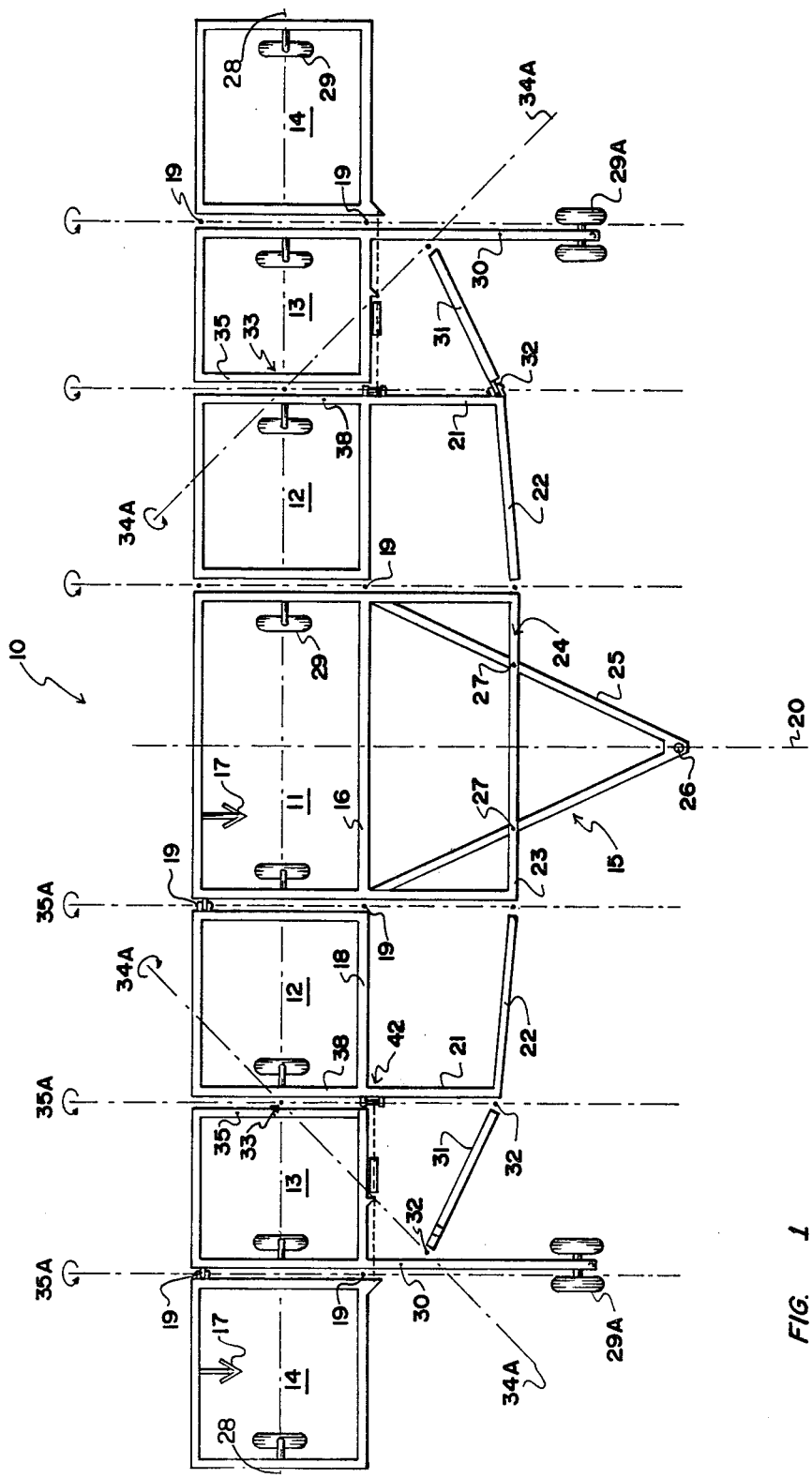
FIG. 1 is a schematic top plan view of one embodiment of the invention.

Proceeding therefore to describe the invention in detail, reference should first be made to FIG. 1, in which a schematic representation of the ground working implement is shown collectively designated 10. In this particular embodiment, the implement consists of a center section 11, a pair of inner wing sections 12, a pair of outer wing sections 13 and a pair of additional outer wing sections 14.

A hitch assembly is provided collectively designated 15, part of which extends forwardly from the center section 11 together with additional hitch assembly members extending from the wing sections 12 and 13 as will hereinafter be described.

The center section 11 comprises a substantially rectangular main frame 16 supporting ground working implements such as duck-foot cultivators 17, although any other form of ground cultivating equipment can be attached to the frames.

The inner wing sections 12 include substantially rectangular frames 18 also supporting similar cultivating implements 17 (not illustrated) and these inner wing sections are hingedly secured one upon each side of the center section frame 16 by means of simple hinges 19 which hinges the inner sections 12 to the center section 11 in a fore and aft line lying substantially parallel with the longitudinal axis 20 of the implement.

A hitch member 21 extends forwardly of the inner wing frames 12 parallel to axis 20 and adjacent the outer sides thereof and a hitch bar 22 extends from the distal end of these members 21 to be pivotally attached to the front corner 23 of a rectangular hitch frame portion collectively designated 24 forming part of the hitch assembly 15.

The hitch assembly 15 also includes the diagonal members 25 which extend forwardly to a hitch point 26 by which the device may be supported upon a source of power such as a tractor or the like (not illustrated).

Alternatively, if a floating hitch connection is provided, then castor wheel assemblies (not illustrated) are provided substantially close to locations 27 where the diagonal members 25 intersect the front of the rectangular frame portion 24.

However, as these details are conventional, it is not believed necessary to describe same further.

All of the sections 11 through 14, are also supported along a transverse line 28, by ground engaging wheels shown schematically by reference character 29. However, as hereinbefore mentioned, in relatively wide machines, the outer wing sections 13 and 14 are too far from the point of support 26 or the wheel assemblies 27 if utilized so that torque action of the tillage tools in the soil results in the flexing of the frame and twisting of the outside sections resulting in uneven depth of tillage.

In order to avoid this, there is provided firstly a castor wheel assembly 29A on the forward end of a hitch member 30 extending forwardly from the outer side of the outer wing section 13 (parallel to member 21) together with a hitch bar 31 extending between intermediate the ends of this hitch member 30 and the distal end of the hitch member 21 which extends from the inner wing section 12.

This hitch bar 31 is pivotally secured to the members 30 and 21, as indicated schematically by reference character 32, the purpose of which will hereinafter be described.

Secondly, the hinging between the outer wing sections 13 and the inner wing sections 12 consists, in this embodiment, of a universal rear hinge assembly collectively designated 33 and shown in detail in FIG. 2.

This, together with the hitch member 30 and hitch bar 31, permits the outer sections 13 to pivot along the line 34A—34A illustrated in FIG. 1 so that the outer wing sections 13 and 14 are flexible along this line and can also rotate about the fore and aft axis 35A between adjacent sections, as the support points 29A and the wheels 29 of the outermost sections 13 and 14, roll over uneven terrain thus assisting in the maintenance of even depth control of the tillage equipment secured to the frames or sections.

This rear universal hinge assembly 33, shown in FIG. 2, consists of a pair of lugs 34 extending outwardly from the side members 35 of the frame 18 of the outer wing section 13. These spaced and parallel lugs 34 are apertured to receive a pivot pin 36 which in turn engages through a member 37 extending from the side frame member 38 of the frame 18 of the inner wing section 12. This member 37 is cylindrical and is bearably supported within frame member 38, in bearing 39.

The pin 36 permits the inner and outer frames 12 and 13 to flex or rotate along the fore and aft axis 35A and the mounting of the pin 37 within bearing 39 permits the inner and outer frames to rotate relative to one another along the transverse axis 28 thus giving a universal action.

Furthermore, it is desired that the aperture 40 within the rearmost lug 34, be elongated so that there is a slight relative movement between the frames around the vertical axis thus facilitating the fully flexible connection between these two frames along the line 34A—34A or the fore and aft axis 35A.

However, when it is desired to move the wing sections to the conventional folded or transport position (not illustrated) mechanism such as that illustrated by reference character 41 (FIG. 4) may be utilized. Such mechanism is well known so that it is not believed necessary to explain same further. When such mechanism is actuated, the wing sections fold upwardly and over towards the center section thus reducing the overall width of the implement and allowing same to be moved along highways and through gates and the like.

Under these circumstances, it is therefore necessary to stabilize the hinging action between sections 12 and 13 so that they can only rotate relative to one another, along the fore and aft axis 35A.

Dealing first with one of the embodiments, reference should be made to FIGS. 2 and 3.

A front hinge assembly is provided collectively designated 42 which can be selectively locked in position as shown in FIGS. 2 and 3 so that the two sections can only rotate around axis 35A or alternatively, can be released so that the universal hinge 33 becomes operative thus enabling the sections to flex substantially along the line 34A—34A as hereinbefore described.

A pair of lugs 43 extend from the frame member 38 of the section 12 and include bearings 44 within which a pin 45 is bearably supported.

A pair of pin blocks or plates 46 extend from the side frame member 35 of the outer wing section 13 and means are provided to pull the pin 45 into engagement with the ends of the blocks or plates 46 thus stabilizing the hinging connection between the two sections.

In the embodiment shown in FIGS. 2 and 3, a flexible member such as a length of chain 47, is secured by one end thereof to the pin block 46 and extends around pin 45 to be connected to the piston rod 48 of a fluid operator 49 operatively connected to a source of hydraulic power (not illustrated) and mounted on the outer wing section 13.

It will be noted that when the fluid actuator is operated to retract the piston rod 48, the pin 45 is clamped against the ends of the pin blocks 46 in any vertical position substantially along the line 50, depending upon the relative position of the two sections when the fluid actuator is operated. When clamped as illustrated, the sections may be folded by the mechanism 41 in the usual manner. When unfolded to the field working position illustrated in FIG. 1, the fluid actuator 49 is released thus freeing the pin 45 from the pin blocks and allowing the necessary universal flexibility to the rear hitch assembly 33 as hereinbefore described.

The mechanism illustrated in FIGS. 2 and 3 may be utilized when outer wing sections 14 are incorporated. However, when the further wing sections 14 are incorporated, mechanism can be used as illustrated in FIG. 4, to clamp the pin 45 against the pin blocks 46 for folding to the transport position.

In this particular embodiment, mechanical linkage 51 extends between the end of chain 47 and a depending portion 52 provided on the inner side of the frame of the section 14 and a snubber 53 extends downwardly from the outer side of the frame of the sections 13 with flexible linkage 54 extending around this snubber 53 to the depending portion 52.

When the further section 14 is folded to the raised or transport position shown in phantom in FIG. 4, by means such as that illustrated by reference character 41, the mechanical linkage and the flexible linkage 54 tightens thus pulling the pin 45 into the stabilized position against the blocks 46 so that the outer wing section 13 can then be moved to the folded position relative to the inner section 12.

When the sections are moved to the field position, then this linkage 51 slackens allowing the hinge pin to release or free itself from the blocks to permit the universal hinge 33 to operate.

An alternative construction is illustrated in FIGS. 5 and 6 to give the desired flexibility yet still permit the necessary stabilizing to take place prior to folding the sections to the transport position. In this embodiment, the outer wing section specifically designated 13A, is pivotally secured to the inner wing section 12 by a fore and aft hinging along the line 35A.

The desired flexibility is provided by forming the outer wing section 13 in two parts or subsections, namely 13-1 and 13-2.

Section 13-1 includes the basic frame 18 together with the hitch member 30 extending forwardly therefrom carrying the castor wheel assemblies 29A and having a digonal brace member 55 extending from adjacent the distal end of the hitch member 30 to a location 56 on the inner side member of the frame 18.

The subsection 13-2 includes a hitch bar 31A fixed by one end thereof to the inner frame member 57 and being pivoted to section 13-1 by means of a pivot 58 and further pivots 59 substantially along a hinge line 60 so that under normal circumstances, the section 13A can pivot along the fore and aft axis 35A or along the axis or hinge line 60. This gives the desired flexibility to the sections together with the further outer wing sections 14, if provided.

However, once again when it is desired to fold the sections to the transport position, means are required to stabilize the hinging action along the line 60.

In this embodiment, a diagonally situated member 61 extends from frame 18 towards the hitch bar 31A and terminates adjacent to a further diagonal member 62 extending between the hitch bar 31A and the side frame member portion 57. Reference to FIG. 6 shows the clamping mechanism which includes a short brace 63 extending upon either side of member 61 and carrying a fluid operator 64 pivoted by one end thereof to the uppermost end of brace 63.

A lower clamp member 65 is provided by one end thereof to the underside of brace 63 and extends substantially parallel with member 61 and slightly beyond member 62 and an upper clamp bar or member 66 is pivoted at the other end of brace 63 on the same locus as the pivotal connection of the fluid operator 64. This also extends parallel to member 61 and above member 62.

The piston 67 of the fluid operator carries an actuating bar 68 pivotally connected by one end thereof to the piston rod and being pivotally connected by the other end thereof to the distal end of the upper clamp member 66. A connector 69 extends between intermediate the ends of the actuator 68 and the lower clamp member 65.

When in the released position, the clamp members 65 and 66 are in the spaced apart position illustrated in full line in FIG. 6 with the fluid operator being in the closed position.

However, when it is desired to stabilize the sections 13-1 and 13-2, the fluid operator is extended to the position shown in phantom in FIG. 6 and this moves the two clamp bars 65 and 66 into contact with the member 62 and clamps the two subsections together thus preventing any hinging along line 60 and allowing the wing sections 13 and 14 to be folded to the transport position.

When the sections are unfolded to the field working position, the fluid actuator 64 is once again operated closing same and moving the two clamp bars or members 65 and 66 apart, thus releasing the subsections 13-1 and 13-2 and permitting the hinging thereof along the line 60.

FIGS. 7 and 8 show another embodiment of the rear hinge assembly which, when in the released or working position, permits the sections 12 and 13 for example to move universally around the universal hinge assembly 33 which is not shown in FIGS. 7 and 8 but which is similar to that illustrated in FIG. 2.

In this embodiment, a relatively short horizontal bar 70 extends from the inner end of the section 12 towards the inner end of the section 13 and adjacent the rear frame members 71 and 72 respectively. This bar is held by means of the brackets 73 welded to the frame.

When in the free floating position illustrated in FIG. 7, the two frames 12 and 13 can move independently at this point but when it is desired to stabilize these prior to lifting for transportation purposes as shown in FIG. 8, a fluid operator 49A is connected via linkage 74 to the upper end of a substantially right angulated arm assembly 75 as by means of pivot pin 76. This arm assembly 75 is pivoted to a support plate 77 at the junction of the two portions thereof, as indicated by pivot pin 78.

When the fluid operator is retracted, the arm portion 79 moves in the direction of arrow 80 until the other arm portion 81 engages the top of the frame 13 and the bar or rod 70.

This aligns frame 12 with frame 13 and as the fluid operator is retracted further, frame 13 is elevated slightly with gravity causing the rod 70 to remain engaged between the angle formed by the end portion of arm 81 and the vertical wall portion 82 of the inner end of the frame 13 as clearly shown in FIG. 8.

A locking arm 83 is pivoted to the support plate 77 by the upper end thereof as indicated by pivot pin 84 and is provided with spaced apart jaws 85 defining a recess 86. As the frame 13 moves to the position shown in FIG. 8, this locking arm 83 swings in the direction of arrow 87 by gravity so that the jaws engage over the pin or rod 70 thus forming a pivot assembly at this point and enabling the section 13 to be elevated for wing lift and transport modes with the frame 13 being held in the static position relative to the center of the pin or rod 70 which is the hinge center and holds the frame sections about the axis of rotation through this center and through the center of the tri-axial hinge assembly 33 as hereinbefore described with reference to FIG. 2.

To return to field position, the fluid actuator 49A is extended and the mechanism rotates until the lower end 88 of the locking arm 83 contacts an extending portion 89 extending from a dependent plate 90 on the inner end of frame 12 so that this portion 89 is solid to frame 12. This occurs within approximately the last 20° of rotation and serves to force the locking arm 83 so that it disengages the jaw 85 from the pin or rod 70 and once again allows frames 12 and 13 to rotate around the axis parallel to the width of the machine.

Figure 9:
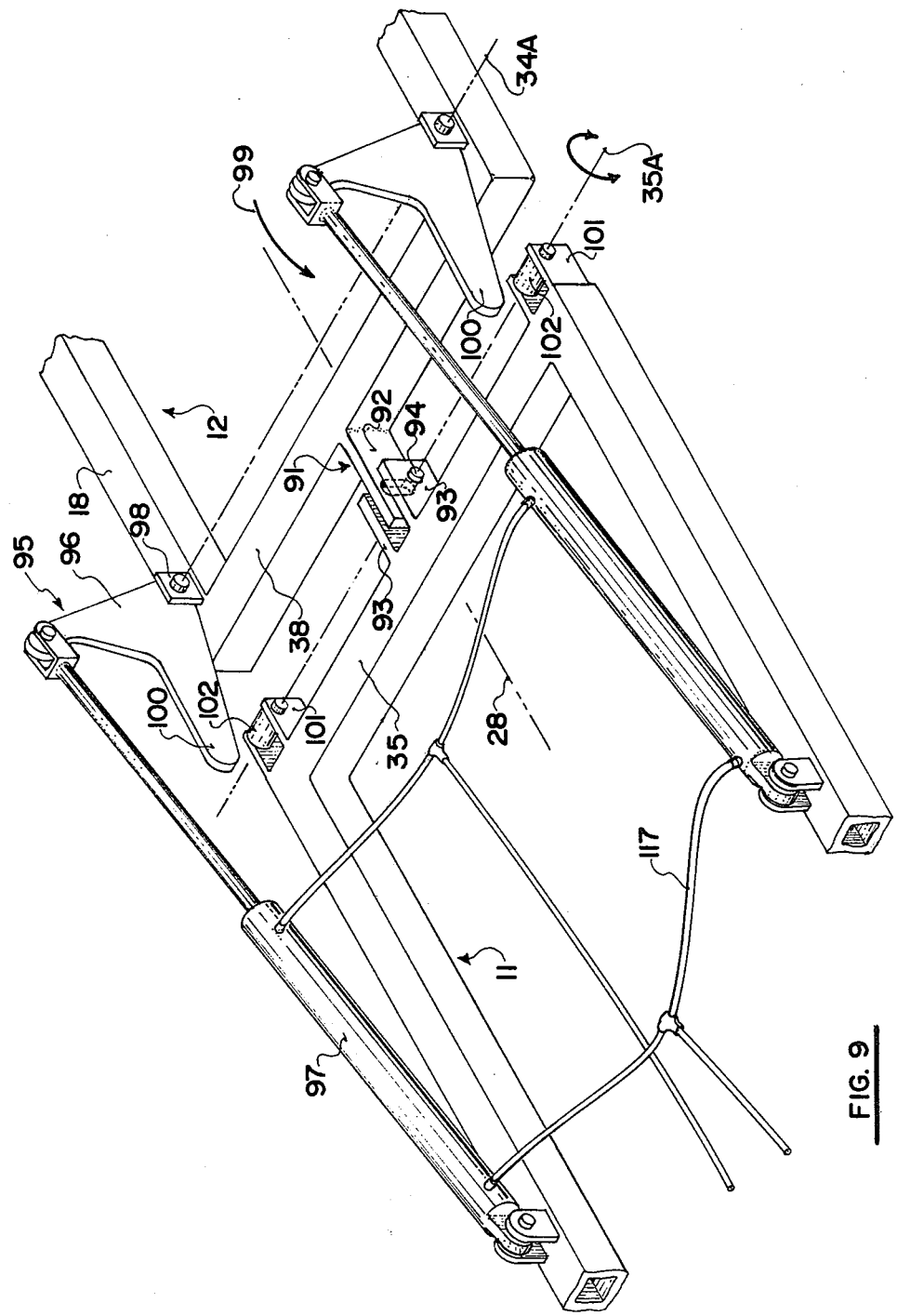
FIG. 9 is a partially schematic isometric view of an alternative embodiment.

FIG. 9 shows a further embodiment of the pivotal connection between adjacent sections, for example, between the center section 11 and the inner wing section 12 or between the inner wing section 12 and the outer wing section 13.

A central hinge is provided generally designated 91 and this comprises a single plate 92 on member 38 and a pair of spaced and parallel members 93 on member 35 with a pivot pin 94 extending through members 92 and 93. Not illustrated, is the aperture in member 92 which is a vertical slot thus permitting approximately 25° rotation plus or minus about axis 28.

In order to pivot the frame 13 relative to frame 12, the fluid operators 97 are connected to the upper ends of arms 95 of bell cranks 96 which are pivotally supported within pairs of bearing plates 98 extending upwardly from adjacent the ends of the frame 13 as clearly shown. The fluid operators are connected to the section 12 and are adapted to move the crank arms in the direction of arrow 99 when it is desired to pivot frame 13 relative to frame 12. The other portion or arms 100 of the cranks 96 extend substantially at right angles to arms 95 as shown.

A fork 101 extends from adjacent each end of cross member 35 of the frame 12 and a pin or latch bar 102 extends across the distal ends of each of these forks so that when the rams or fluid operators 97 are retracted, the ends of the arms 100 and 100A strike these pins or latches and the under sides of arms 100 engage upon the upper surface of frame 13. This action causes plates 92 to rotate about axis 28 and align with plates 93, stabilizing the two sections 12 and 13 and forming a solid hinge line 35A so that further rotation of the cranks arms 96 by retraction of rams 97, lifts the frame 13 as in a conventional wing lift. When in this position, the forks 101, pins 102 and arms 100 form hinge assemblies and the section 13 can only move around axis 35A regardless of the unevenness of the terrain.

The reverse action permits frame 13 to return by gravity as the rams are extended whereupon the loose hinge 91 gives the necessary flexibility while the machine is still in use.

The preferred embodiment is shown in FIGS. 10 to 16 and shows a connection similar to FIG. 9, between the center section 11 and one wing section 12. However, it will be appreciated that a similar connection may be provided between any adjacent sections as, for example, between sections 12 and 13, shown in FIG. 9.

Figure 10:
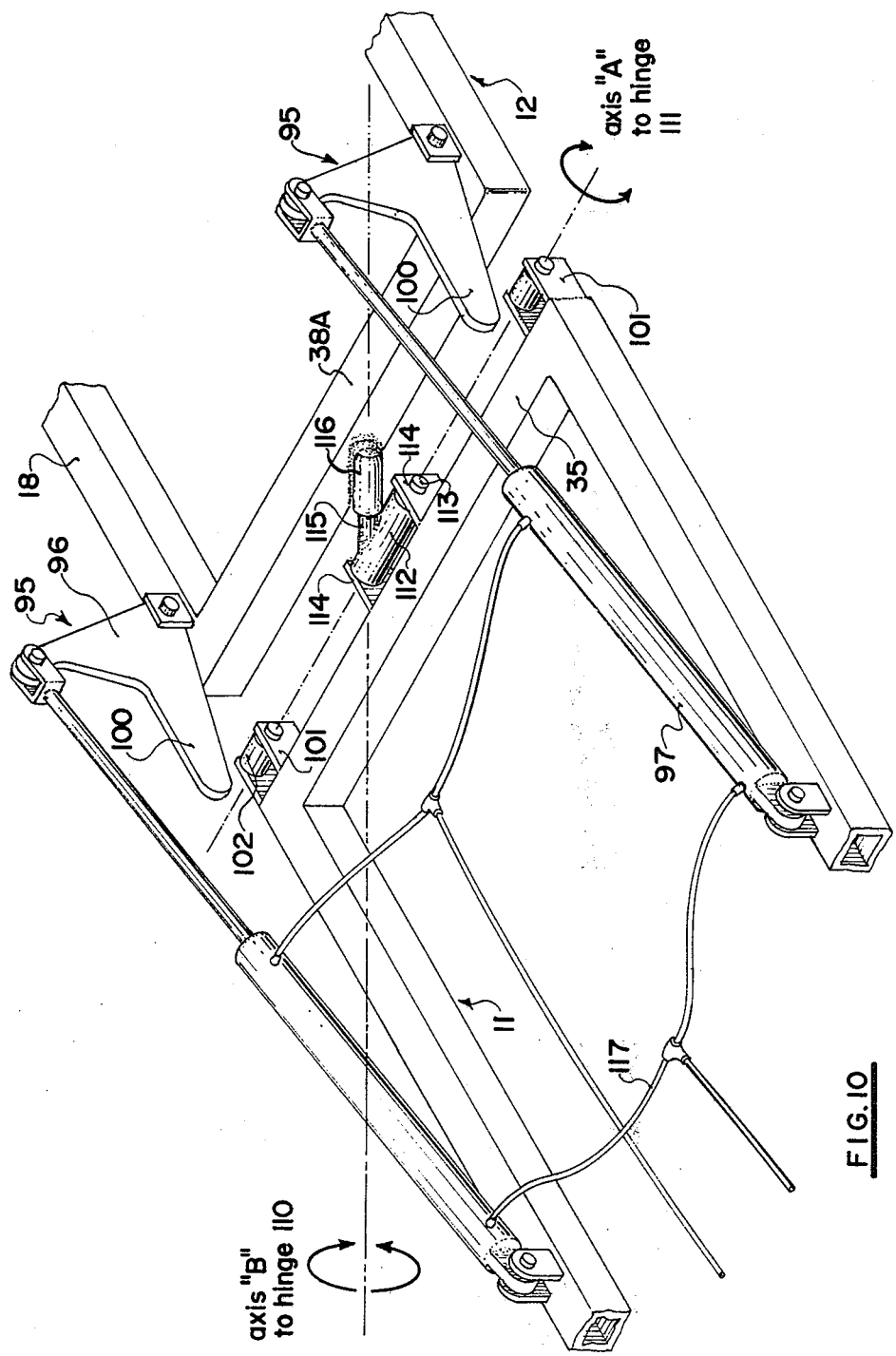
FIG. 10 is a view similar to FIG. 9, but showing the preferred embodiment and is reversed relative to FIGS. 11 and 14.

In FIG. 10, the hitch assembly 15 includes the two diagonal members 25 extending from the ends of the front transverse frame member 16 to the hitch 26 and a forward cross member 103 spans the members 25 and is secured thereto, with the ends of this cross member extending beyond the members 25 and terminating adjacent the fore and aft axis "A" which is parallel to the longitudinal axis 20 of the center section 11.

The wing section 12 includes the spaced and parallel front and rear members 18 and 18A with an inner member 38A similar to member 38 in FIG. 9, but which in the construction shown in FIG. 10, inclines outwardly from the member 18A towards member 18 and is connected to member 18 spaced inwardly from the inner end thereof to provide room for the centrally located universal connection collectively designated 104 which substitutes for the connection 91 in FIG. 9.

The outer member 38B of the wing frame 12 is parallel to the axis "A" (and the longitudinal axis 20 of the center section) and extends forwardly beyond the front of the wing frame with this forward extension forming a wing hitch member 105 similar to wing hitch member 30 in FIG. 1.

The front end of this extension is forwardly of the cross member 103 and carries a castor wheel assembly 106 which is conventional in construction and provides support for the front end and to the front of the wing section 12. Both the center section and wing sections are also supported along a transverse line 28 by pairs of wheels 107 mounted on walking beams 108 supported rearwardly of the front frame member 16 and 18A respectively and the walking beam assemblies are also conventional in construction.

A transverse hitch member 109 extends between the extension 105 and the distal ends of transverse hitch member 103 and is pivotally connected to these members by pivotal connections 110 and 111 respectively. These are simple pin connections normally permitting pivoted action about axis "A". These connections 110 and 111 are mechanically loose pivotal connections not only allowing pivoting action around an axis parallel to axis "A", but also around a diagonal axis identified as axis "B" which extends from the pivot 110 and through the universal pivotal connection 104. Alternatively, other conventional pivots such as spherical bearings could be used at this location.

FIG. 10 shows details of connection 104 which consists of a V-hinge with one part rotating around axis "A" and the other rotating around axis "B".

A length of tubing 112 constituting a bearing tube is journalled for partial rotation upon pin or shaft 113 extending between spaced and parallel lugs 114 extending from end member 35 of the center section 11. A short stub shaft 115 is secured to the wall of tubing 112 adjacent one end thereof and extends at an angle therefrom along the axis "B". A socket tube 116 is secured to the end member 38A of the wing section 12 and also lies along axis "B" and the stub shaft 115 bearably engages within the socket tube.

This permits relative movement between the sections along axes "A" and "B" and a resultant movement around a vertical axis "C".

Figure 11:
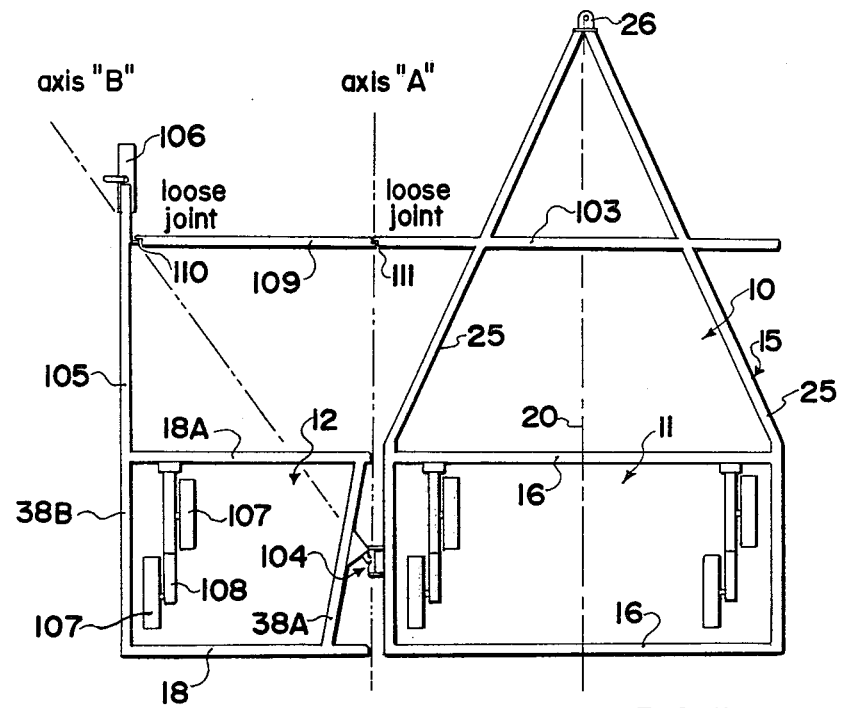
FIG. 11 is a schematic plan view of the preferred embodiment including a center section and one wing section together with the hitch connection shown in use upon flat terrain.
Figure 12:
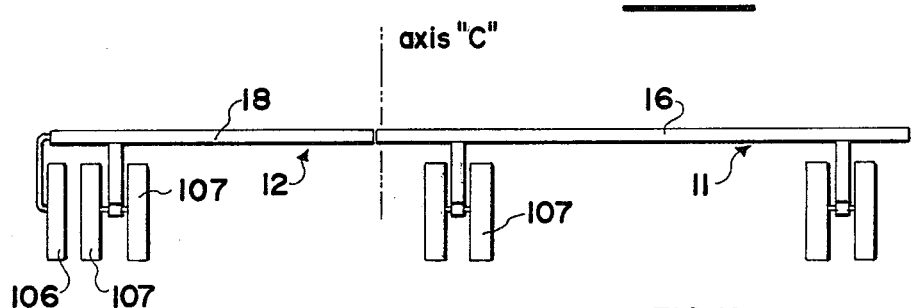
FIG. 12 is a rear view of FIG. 11.
Figure 13:
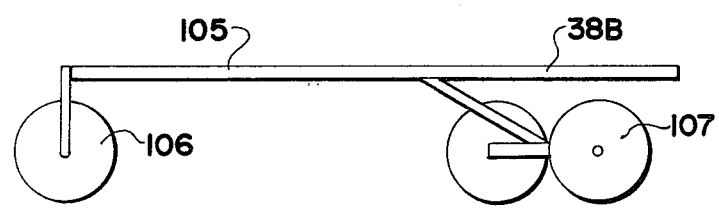
FIG. 13 is a side view of FIG. 11.

In FIGS. 11, 12 and 13 the implement is shown with the relevant relationship of the sections 11 and 12 when the implement is on flat or horizontal ground.

Figure 14:
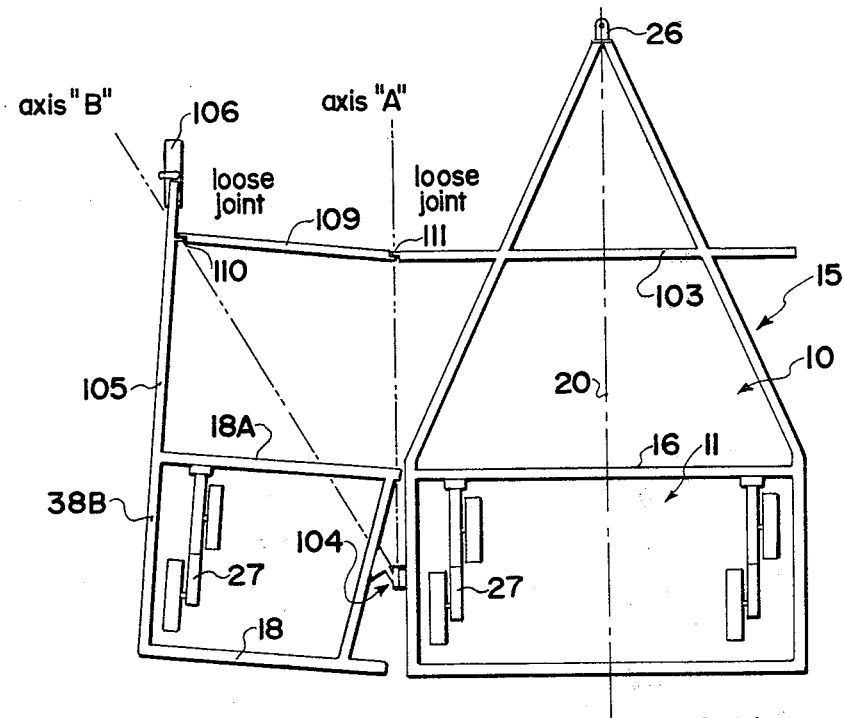
FIG. 14 is a view similar to FIG. 11 but with the front castor wheel elevated due to a rise in the ground at this point.
Figure 15:
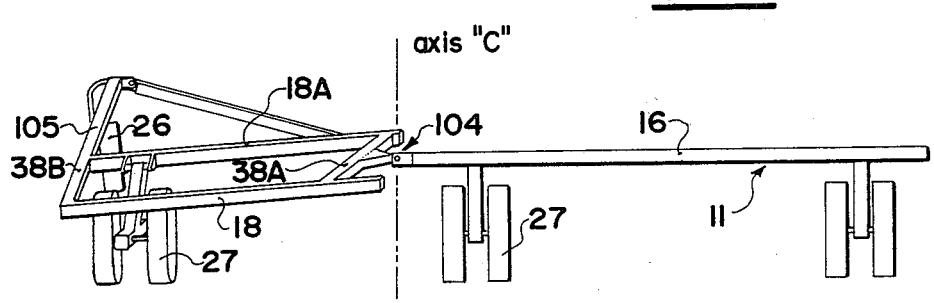
FIG. 15 is a rear view of FIG. 14.
Figure 16:
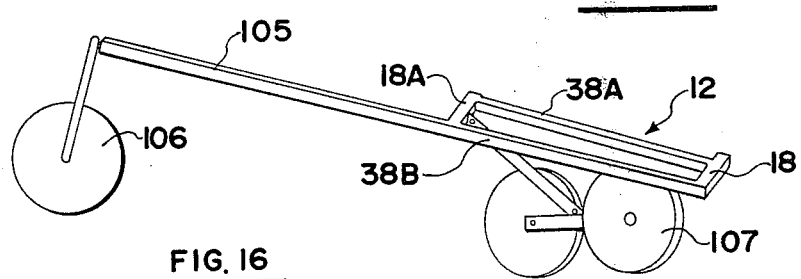
FIG. 16 is a side view of FIG. 14.

However, if, for example, the leading castor wheel assembly 106 engages a rise in the ground then the wing section rises at this point and rotates around axes "A", "B" and "C" to take up the relevant position shown, for example, in FIGS. 14, 15 and 16 with the loose hinge 110 permitting the movement around axis "B" and thus in conjunction with the movement around axis "A", giving the resultant effective movement around axis "C".

As in FIG. 9, when it is desired to move the wing section 12 to the transport position, rams 97 which are interconnected with the hydraulic hoses or conduits 117, and connected to a conventional source of power (not illustrated) are retracted, thus moving arms 100 onto the surfaces of the frame of wing sections 12 and contacting the pins or latch bars 102 with the ends thereof. This stabilizes the wing section 12 relative to the center section 11 so that it can only move around axis "A" regardless of the level of the terrain. Further retraction of rams 97 hinges the wing section around axis "A" thus elevating it to the transport position. Reversal of the ram movement lowers the wing section 12 to the working position and releases the front and rear stabilizing engagement of arms 100 thus returning the universal hinge 104 to the working position shown in FIG. 10.

Although FIG. 10 illustrates a connection between the center section 11 and the wing section 12, nevertheless it will be appreciated that a similar connection can be provided between the inner wing section 12 and the outer wing section 13 with the hitch member 31 and frame member 30 of FIG. 1 substituting for the hitch member 109 and frame member 105. Also the universal hinge 91 shown in FIG. 9 can be used in place of the universal hinge 104 shown in FIGS. 10 to 16, of course, the universal hinge 104 can be used instead of the hinge 91 in FIG. 9.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a ground working implement which includes a center section with two sides and at least an inner wing section and an outer wing section in side by side relationship upon each of said sides of said center section and moveable from a field working position to a transport position and vice versa, said inner and outer wing sections each including an inner side and an outer side, the inner side of said inner wing section being adjacent said center section, said outer side of said inner wing section being adjacent the inner side of said outer wing section, a hitch assembly extending forwardly from said center section and ground engaging wheels supporting said sections; the improvement comprising in combination hinge means between adjacent ones of said wing sections, said hitch assembly including a main hitch member extending forwardly from said center section, a wing hitch member extending forwardly from the outer side of each of said wing sections parallel to but spaced from the central fore and aft axis of said center section, a ground engaging castor wheel assembly on the front end of said outer wing hitch member, a transverse hitch member extending from said outer wing hitch member and adjacent the front end thereof, to said inner hitch member, said transverse hitch member being pivotally secured by the inner end thereof to said inner hitch member and by the outer end thereof to said outer wing hitch member, a universal hinge operatively connecting said outer wing section to said inner wing section intermediate the front and rear sides of said inner and outer wing sections, the pivotal securement between said transverse hitch member and said inner hitch member and said universal hinge, lying on a first axis spaced from and parallel to the central fore and aft axis of said center section, and spaced from the pivotal securement between said transverse hitch member and said outer wing hitch member; and said universal hinge, lying on a second axis diagonally situated with respect to said first axis and intersecting said first axis whereby said outer wing section can pivot along either or both of said first and second axes, and means to selectively lock and release said outer wing section for pivotal movement around said second axis such that said outer wing section is free to pivot around said first and second axes when in the ground working position and is restricted to pivot around said first axis only, prior to and during movement towards said transport position.

2. The invention according to claim 1 in which said universal hinge includes a pair of lugs extending from one of said inner and outer wing sections upon each of said sides of said center section, a mounting member extending from the other of said inner and outer wing sections upon each of said sides of said center section, a substantially horizontal hinge pin operatively connecting said mounting member to said lugs, thereby mounting said one of said wing sections for pivotal movement relative to the other of said wing sections around said first and second axes.

3. The invention according to claim 2 which includes a vertical slot in said mounting member, said horizontal hinge pin freely engaging through said vertical slot.

4. The invention according to claim 3 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

5. The invention according to claim 2 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

6. The invention according to claim 1 in which said second axis intersects said first axis at said universal hinge at an angle less than 90° from said first axis.

7. The invention according to claim 6 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

8. The invention according to claim 7 in which said actuating arms comprise bell cranks pivotally mounted centrally thereof one adjacent the front and one adjacent the rear of said outer wing section, each of said bell cranks including a latch bar contacting arm and a connecting arm extending substantially at right angles from said latch bar contacting arm, a fluid operator for each said bell crank mounted on said inner section and being operatively connected one to each of said connecting arms.

9. The invention according to claim 1 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

10. The invention according to claims 9, 5 or 4 in which said actuating arms comprise bell cranks pivotally mounted centrally thereof one adjacent the front and one adjacent the rear of said outer wing section, each of said bell cranks including a latch bar contacting arm and a connecting arm extending substantially at right angles from said latch bar contacting arm, a fluid operator for each said bell crank mounted on said inner section and being operatively connected one to each of said connecting arms.

11. A ground working implement comprising in combination a center section, a hitch assembly extending forwardly from said center section, at least two wing sections with one of said wing sections upon one side and the other of said wing sections upon the other side of said center section, each of said wing sections including an inner wing section and an outer wing section, movable from a ground working position to a transport position and vice versa, said inner and outer wing sections each including an inner side and an outer side, the inner side of said inner wing section being adjacent said center section, said outer side of said inner wing section being adjacent the inner side of said outer wing section, a wing hitch member extending forwardly from the outer ends of said inner and outer wing sections, a first transverse hitch member extending between the distal ends of said wing hitch members and a second transverse hitch member extending between the wing hitch members of said inner wing section and said hitch assembly of said center section, means for pivotally connecting the distal ends of said first transverse hitch member to said wing hitch members and further means for pivotally connecting said second transverse hitch member to adjacent the front ends of said wing hitch member of said inner wing section and said hitch assembly of said center section, ground engaging wheels supporting each of said sections, and a castor wheel assembly on the front end of at least one of said wing hitch members, a first universal hinge assembly operatively connecting said inner wing section to said center section intermediate the front and rear sides thereof, a second universal hinge assembly operatively connecting said inner wing section to said outer wing section intermediate the front and rear sides thereof, said first universal hinge assembly and the pivotal connecting means between said second transverse hitch member and said hitch assembly of said center section, lying on a first axis parallel to and spaced from the central fore and aft axis of said center section, said pivoting connection means between said first transverse hitch member and said wing hitch member of said inner wing section, lying on a second axis diagonal to said first axis and passing through said first universal hinge assembly; said second universal hinge assembly and the pivotal connection means between said first transverse hitch assembly and said wing hitch member of said inner wing section, lying on a further first axis parallel to and spaced from the central fore and aft axis of said center section, said pivotal connection means between said first transverse hitch member and said wing hitch member of said outer wing section, lying on a further second axis diagonal to said further first axis and passing through said second universal hinge assembly, and means to selectively lock and release said outer wing section relative to the inner wing section and said inner wing section relative to the center section such that each of said wing sections is free to pivot around said first and second axes when in the ground working position and are restricted to pivot around said first axis only, prior to and during movement of said wing sections towards said transport position.

12. The invention according to claim 11 in which each said universal hinge assembly includes a pair of lugs extending from one of said sections, a mounting member extending from the other of said sections, a substantially horizontal hinge pin operatively connecting said mounting member to said lugs, thereby mounting said one section for pivotal movement relative to the other section around said first and second axes.

13. The invention according to claim 12 which includes a vertical slot in said mounting member, said horizontal hinge pin freely engaging through said vertical slot.

14. The invention according to claim 13 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing section relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

15. The invention according to claim 12 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

16. The invention according to claim 11 in which each said universal hinge assembly includes a V-hinge component, said V-hinge component including a bearing tube lying on said first axis, a shaft secured to the adjacent end of said center section also on said first axis, said bearing tube being journalled upon said shaft for rotation about said first axis, a stub shaft extending from one side of said bearing tube along said second axis and a socket tube extending from the inner end of said outer section also lying along said second axis, said stub shaft being bearably supported within said socket tube for rotation about said second axis.

17. The invention according to claim 16 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

18. The invention according to claim 17 in which said actuating arms comprise bell cranks pivotally mounted centrally thereof one adjacent the front and one adjacent the rear of said wing section, each of said bell cranks including a latch bar contacting arm and a connecting arm extending substantially at right angles from said latch bar contacting arm, a fluid operator for each bell crank mounted on said center section and being operatively connected one to each of said connecting arms.

19. The invention according to claim 11 in which said means to selectively lock and release said wing section, includes a pair of latch bars one extending from adjacent the front inner end of each of said inner wing sections, the other extending from adjacent the rear inner end of each of the inner wing sections actuating arms pivotally mounted on said outer wing sections selectively engageable with said latch bars to align and stabilize each of said outer wing sections relative to each of said inner sections adjacent thereto to restrain said outer wing sections to movement about said first axis only, and means operatively connected to said actuating arms to engage same upon said latch bars and then to move said inner wing sections from the field working position to the transport position and vice versa.

20. The invention according to claims 19, 15 or 14 in which said actuating arms comprise bell cranks pivotally mounted centrally thereof one adjacent the front and one adjacent the rear of said wing section, each of said bell cranks including a latch bar contacting arm and a connecting arm extending substantially at right angles from said latch bar contacting arm, a fluid operator for each bell crank mounted on said center section and being operatively connected one to each of said connecting arms.

21. A ground working implement comprising in combination a center section, a hitch assembly extending forwardly from said center section, at least one wing section upon each side of said center section, movable from a field working position to a transport position and vice-versa, said each of said wing sections including an inner side and an outer side, the inner side of said wing sections being adjacent said center section, a wing hitch member extending forwardly from the outer side of each of said wing sections, a transverse hitch member extending between the distal end of said wing hitch member and said hitch assembly of the center section, means for pivotally connecting one end of said transverse hitch member to the distal end of said wing hitch member and the other end of said transverse hitch member to said hitch assembly of said center section, ground engaging wheels supporting each of said wing sections and said center section and a castor wheel assembly on the front end of each of said wing hitch members, a universal hinge assembly operatively connecting each of said wing sections to said center section intermediate the front and rear sides of said sections, said universal hinge, and said pivotal connecting means between said corresponding transverse hitch member and said hitch assembly of said center section, lying on a first axis parallel to and spaced from the central fore and aft axis of said center section; the pivotal connecting means are between said corresponding transverse hitch member and said wing hitch member; and said universal hinge lying on a second axis extending diagonally between said last mentioned pivotal connecting means and said universal hinge, and means to selectively lock and release said wing sections relative to the center section such that each of said wing sections is free to pivot around said first and second axis when in the ground working position but are restricted to pivot around said first axis only, prior to and during movement of said wing sections towards said transport position.

22. The invention according to claim 21 in which said universal hinge assembly includes a V hinge component, said V hinge component including a bearing tube lying on said first axis, a shaft secured to the inner side of said wing section also on said first axis, said bearing tube being journalled upon said shaft for rotation about said first axis, a stub shaft extending from one side of said bearing tube along said second axis and a socket tube extending from the side of said center section also lying along said second axis, said stub shaft being bearably supported within said socket tube for rotation about said second axis.

23. The invention according to claim 22 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

24. The invention according to claim 23 in which said actuating arms comprise bell cranks pivotally mounted centrally thereof one adjacent the front and one adjacent the rear of each of said wing sections, each of said bell cranks including a latch bar contacting arm and a connecting arm extending substantially at right angles from said latch bar contacting arm, a fluid operator for each bell crank mounted on said center section and being operatively connected one to each of said connecting arms.

25. The invention according to claim 21 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

26. The invention according to claim 25 in which said actuating arms comprise bell cranks pivotally mounted centrally thereof one adjacent the front and one adjacent the rear of each of said wing sections, each of said bell cranks including a latch bar contacting arm and a connecting arm extending substantially at right angles from said latch bar contacting arm, a fluid operator for each bell crank mounted on said center section and being operatively connected one to each of said connecting arms.

27. A ground working implement comprising in combination a center section, a hitch assembly extending forwardly from said center section, at least two wing sections one upon each side of said center section in side by side relationship each of said wing sections including an inner wing section and an outer wing section, movable from a field working position to a transport position and vice versa, said inner and outer wing sections each including an inner side and an outer side, the inner side of said inner wing section being adjacent said center section, the outer side of said inner wing section being adjacent the inner side of said outer wing section, a wing hitch member extending forwardly from the outer sides of each of said inner and outer wing sections, a first transverse hitch member extending between the distal ends of said wing hitch members of adjacent inner and outer wing sections and a second transverse hitch member extending between the distal end of the wing hitch member of said inner wing sections to the hitch assembly of said center section, means pivotally connecting the distal ends of said first transverse hitch member to adjacent the distal ends of said wing hitch members, ground engaging wheels supporting each of said sections and a castor wheel assembly on the front end of at least said wing hitch member of said outer wing section, a universal hinge assembly operatively connecting said inner wing sections to the adjacent outer wing sections, the pivotal connecting means between the end of said first transverse hitch member and said wing hitch member of said inner wing section, lying on an axis parallel to and spaced from the central fore and aft axis of said center section and passing through said universal hinge, the pivotal connecting means between the end of the first transverse hitch member and the wing hitch member of the outer wing section, lying on a second axis extending diagonally between said last mentioned pivotal connecting means and the universal hinge and passing through said universal hinge, and means to selectively lock and release said outer wing section relative to said inner wing section such that said outer wing section is free to pivot around said first and second axes when in the ground working position but is restricted to pivot around said first axis only, prior to and during movement of said outer wing section towards said transport position.

28. The invention according to claim 27 in which said universal hinge assembly includes a V hinge component, said V hinge component including a bearing tube lying on said first axis, a shaft secured to the outer end of said inner section also on said first axis, said bearing tube being journalled upon said shaft for rotation about said first axis, a stub shaft extending from one side of said bearing tube along said second axis and a socket tube extending from the outer end of said outer wing section also lying along said second axis, said stub shaft being bearably supported within said socket tube for rotation upon said second axis.

29. The invention according to claim 27 in which said means to selectively lock and release said outer wing section includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner wing sections adjacent thereto and to restrain said outer wing sections to movement about said first axis only, and means operatively connected to said actuating arms to engage same upon said latch bars and then to move said outer wing section from the field working position to the transport position and vice versa.

30. The invention according to claim 28 in which said means to selectively lock and release said wing section, includes a pair of latch bars one extending from adjacent the front inner end of each of said inner wing sections, the other extending from adjacent the rear inner end of each of the inner wing sections, actuating arms pivotally mounted on said outer wing sections selectively engageable with said latch bars to align and stabilize each of said outer wing sections relative to each of said inner sections adjacent thereto and to restrain said outer wing sections to movement about said first axis only, and means operatively connected to said actuating arms to engage same upon said latch bars and then to move said inner wing sections from the field working position to the transport position and vice versa.

31. The invention according to claim 29 in which said actuating arms comprise bell cranks pivotally mounted centrally thereof one adjacent the front and one adjacent the rear of said outer wing section, each of said bell cranks including a latch bar contacting and a connecting arm extending substantially at right angles from said latch bar contacting arm, a fluid operator for each said bell crank mounted on said inner wing section and being operatively connected one to each of said connecting arms.

32. The invention according to claim 30 in which said actuating arms comprise bell cranks pivotally mounted centrally thereof one adjacent the front and one adjacent the rear of said outer wing section, each of said bell cranks including a latch bar contacting and a connecting arm extending substantially at right angles from said latch bar contacting arm, a fluid operator for each said bell crank mounted on said inner wing section and being operatively connected one to each of said connecting arms.

* * * * *